United States Patent [19]

Busse et al.

[11] 4,405,457

[45] Sep. 20, 1983

[54] PLATE-TYPE FILTER PRESS WITH A CLEANING TRUCK

[75] Inventors: Oswald Busse; Hugo Klesper, both of Aarbergen, Fed. Rep. of Germany

[73] Assignee: Passavant-Werke AG & Co. KG, Fed. Rep. of Germany

[21] Appl. No.: 319,141

[22] Filed: Nov. 9, 1981

[30] Foreign Application Priority Data

Nov. 20, 1980 [DE] Fed. Rep. of Germany ....... 3043821

[51] Int. Cl.³ ............................................. B01D 25/12
[52] U.S. Cl. .................................. 210/225; 210/230; 210/236; 100/112; 100/198; 100/218
[58] Field of Search ............................... 210/224–230, 210/236; 100/112, 196, 197, 198, 218

[56] References Cited

U.S. PATENT DOCUMENTS

| 3,637,082 | 1/1972 | Bentzien | 210/225 |
| 4,132,647 | 1/1979 | Sakuma | 210/230 |
| 4,181,615 | 1/1980 | Wilms | 210/230 |
| 4,226,721 | 10/1980 | Baas | 210/230 X |
| 4,272,376 | 6/1981 | Schotten | 210/230 |

FOREIGN PATENT DOCUMENTS

| 2822202 | 10/1979 | Fed. Rep. of Germany | 210/225 |
| 1003954 | 9/1965 | United Kingdom | 210/225 |

Primary Examiner—David R. Sadowski
Attorney, Agent, or Firm—Woodford R. Thompson, Jr.

[57] ABSTRACT

A plate-type filter press having a cleaning truck movable in the direction of movement of the slidable filter plates embodies a drive and a pusher adapted to be brought into engagement with the filter plates. The cleaning truck has a releasable brake and the pusher is extensible by the drive in the direction of movement of the filter plates.

8 Claims, 1 Drawing Figure

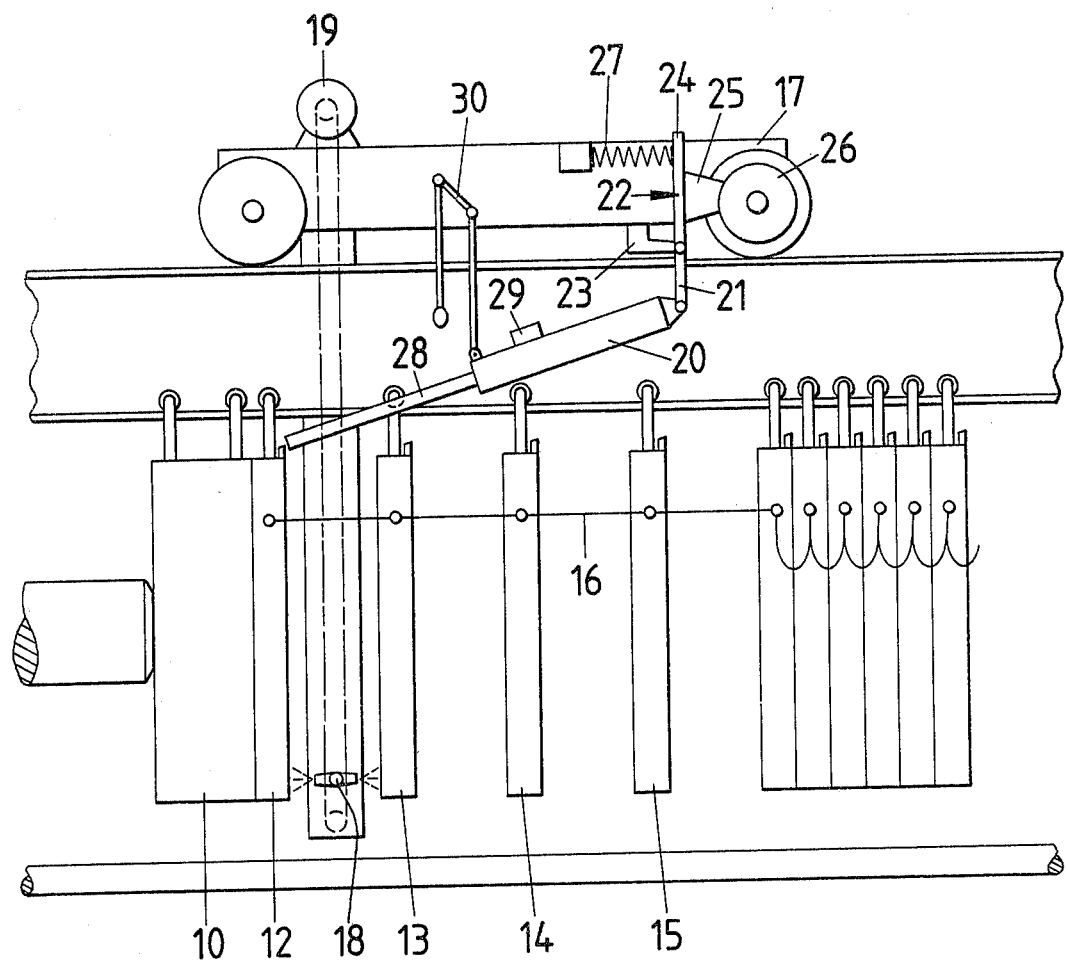

PLATE-TYPE FILTER PRESS WITH A CLEANING TRUCK

BACKGROUND OF THE INVENTION

This invention relates to a plate-type filter press having a cleaning truck transportable in the direction of movement of the slidable filter plates and embodying a drive and a pusher adapted to be brought into engagement with the filter plates.

As is well known, in plate-type filter presses, filter cake accumulates between adjacent plates in the filter chamber and is discharged after the plates are opened. However, the filter cloths covering the filter plates become clogged during the course of use, so that their permeability is greatly decreased and the filter capacity is considerably reduced. It is therefore necessary to clean the cloths after they have been in use for fairly long intervals of time.

To clean the filter cloths, it is customary to use spray pipes having nozzles directed towards the filter surface. Such spray pipes are supplied with water under pressure, and depending upon the arrangement, are moved either horizontally or vertically along the surface to be cleaned. The guide means and drive means for the spray pipes are located on the cleaning truck. There are various types of such filter cloth cleaning devices which are well known in the art. If only one interstice between two plates is available at a time, then the two surfaces will be cleaned with two oppositely directed rows of nozzles. If each plate is accessible from both sides, then two spray pipes may be used to clean off both sides of the plates simultaneously.

Prior art apparatus of the above type is disclosed in Offenlegungsschrift No. 28 22 202 wherein the cleaning truck must move relative to the filter plates in order to slide the filter plates consecutively against the open pressure pad or the filter plates already present at this location. The cleaning truck then returns to its cleaning position above the next filter plate. Accordingly, the cleaning truck requires a reversible drive and the control means for bringing about such oscillating, travelling movements is also complicated.

SUMMARY OF THE INVENTION

It is an object of this invention to improve the apparatus mentioned above in such a way that the cleaning truck, and particularly its means for controlling movement, is simplified.

In order to achieve this object the plate filter press according to our invention embodies a cleaning truck which has a releasable brake and a pusher which is extensible by the drive in the direction of movement of the filter plates.

When a cleaning operation is complete, the cleaning truck, which is firmly held by its brake, extends the pusher and thereby moves the filter plate, which has been cleaned at least on its front surface, against the open pressure pad or the filter plates already present at this location. The brake is then released and the pusher is extended a further distance which causes the cleaning truck to be repelled by the filter plate which has just been moved and to then pass into its next cleaning position. The filter plates may be mutually connected by chains or other distance limiting elements so that the sliding or moving of each filter plate which has been cleaned brings the next filter plate into the cleaning position. When the cleaning truck has attained its next cleaning position it is anchored by its brake. The pusher is then retracted in order to engage the filter plate which is being cleaned. After the cleaning operation is complete the work cycle described above is repeated.

In accordance with our invention only a short stroke oscillating device is required, thus eliminating the requirement of an endless revolving, reversible drive. This drive, step by step, first slides a filter plate and then moves the cleaning truck in the opposite direction with this movement cycle being controlled and automated very simply. The cleaning truck can thus slide the plates during normal opening with cake rejection and also it replaces the plate drive.

The drive may in practice be of any conventional construction. However, we have found it to be particularly advantageous where a piston-cylinder unit forms the drive and the pusher for the plate-type filter press. This produces an extremely simple construction which can be controlled as a function of the stroke of the piston-cylinder unit in a trouble-free manner.

The piston-cylinder unit is preferably pivotally connected to the cleaning truck so that each time it moves it can travel over the next filter plate to be slid before its engagement. Also, deviating projections or other structural modifications to the filter plates are unnecessary.

According to our invention the brake may be releasable as a function of the stroke of the pusher and, as an alternative to this, it is possible for the brake to be releasable as a function of the actuating force of the pusher and/or of the sliding resistance of the filter plates. In both cases, a simple automation of the work cycle is obtained.

The stroke of the pusher is advantageously adjustable in order to permit an adaptation to filter plates of different thicknesses.

DESCRIPTION OF THE DRAWING

The invention is explained more fully hereinbelow with reference to a preferred exemplary embodiment and in conjunction with the accompanying drawing wherein the single view is a schematic side elevational view of a plate-type filter press.

DETAILED DESCRIPTION

Referring now to the drawing, the plate-type filter press comprises a detachable pressure pad 10 and a plurality of filter plates, the first four of which are numbered 12, 13, 14 and 15. The filter plates are mutually connected by chains 16 or other distance limiting elements, so that when one of the filter plates comes into abutment against the open pressure pad 10 or against the filter plates already present at this location, the next filter plate, in the present case the filter plate 13, has attained its cleaning position and the next two filter plates 14 and 15 have been drawn away from the plate stack, as shown.

A cleaning truch 17 is transportable along a guide member above the filter plates in the direction of movement of the filter plates, as shown. The cleaning truck 17 carries a cleaning apparatus 18 in the form of a spray pipe which is carried by a chain and is movable upwardly and downwardly by a motor 19.

The cleaning truck 17 also carries a piston-cylinder unit 20 which forms a drive and a filter plate pusher. The piston-cylinder unit is pivotally connected to one arm 21 of a two-armed lever 22 which in turn is pivotally mounted on a bracket 23 carried by the cleaning truck 17. The other arm 24 of the lever 22 carries a brake shoe 25 which is urged into contact with a brake drum 26 by a compression spring 27. In the position shown in the drawing, the piston-cylinder unit 20 has just brought the cleaning truck 17 into its cleaning position above the interstice between the filter plates 12 and 13. In this position, the cleaning truck 17 is held firmly by the brake unit 25-26. The piston rod 28 of the piston-cylinder unit 20 can then be retracted, whereby it travels over the filter plate 13 and comes into engagement therewith.

After the cleaning operation is complete the piston rod 28 is extended again, whereby it brings the filter plate 13 into abutment against the filter plate 12. The extension stroke of the piston rod 28 then continues, with the rod 28 overcoming the force exerted by the compression spring 27. The brake unit is thus released whereupon the cleaning truck 17 moves away from the pressure pad 10 a sufficient distance for it to pass into its next cleaning position relative to the interstice between the filter plates 13 and 14. The cleaning truck 17 is stopped in this position by deenergizing the piston-cylinder unit 20 by means of a conventional limit switch 29. The brake shoe 25 then re-engages the drum 26 and the work cycle described above can commence again.

In order to initiate the first cleaning operation, the brake shoe 25 is released from the drum 26 manually, the piston-cylinder unit 20 is raised by means of a lever assembly 30, and the cleaning truck 17 is pushed into its proper position near the pressure pad 10. Further operation occurs automatically after lowering the piston-cylinder unit. When all the plates have been cleaned, the truck 17 is slid back into the initial position manually.

While we have shown our invention in but one form, it will be obvious to those skilled in the art that it is so limited, but is susceptible of various changes and modifications without departing from the spirit thereof.

What we claim is:

1. In a plate-type filter press having a plurality of slidable filter plates transportable longitudinally of the filter press toward an open side of the press and in an opposite direction toward a closed side of the press,
   (a) distance limiting element means for connecting adjacent filter plates to each other and for providing that transport of each filter plate to said open side of the press moves the next filter plate into an intermediate position for cleaning,
   (b) a self-propelled cleaning truck means mounted for movement along a guide member in the direction of transport of the filter plates,
   (c) an extensible drive and pusher carried by said cleaning truck means with said pusher being extensible through a stroke by said drive in the direction of transport of said filter plates selectively into and out of engagement with each filter plate to be transported toward said open side of the press,
   (d) a releasable brake means carried by said cleaning truck means for holding said cleaning truck means in a fixed position while said brake means is in an engaged position and for permitting movement of said cleaning truck means upon release of said brake means,
   (e) means urging said brake means toward said engaged position for holding said cleaning truck means in said fixed position during transport of each said filter plate toward said open side of the press and during retraction of said pusher, and
   (f) brake release means operatively connecting said drive and pusher to said brake means for releasing said brake means in response to further extension of said pusher after completing the transport of each said filter plate to said open side of the press.

2. A plate-type filter press as defined in claim 1 in which the drive and pusher is in the form of a piston-cylinder unit.

3. A plate-type filter press as defined in claim 2 in which said piston-cylinder unit is pivotally connected to the cleaning truck means.

4. A plate-type filter press as defined in claim 1 in which said brake means is releasable as a function of the stroke of the pusher.

5. A plate-type filter press as defined in claim 1 in which said brake means is releasable as a function of the actuating force of the pusher.

6. A plate-type filter press as defined in claim 1 in which said brake means is releasable as a function of the sliding resistance of the filter plates.

7. A plate-type filter press as defined in claim 1 in which the stroke of the drive is adjustable.

8. A plate-type filter press as defined in claim 1 in which said means urging said brake toward said engaged position is a spring member.

* * * * *